United States Patent [19]

Shu

[11] Patent Number: 5,103,907
[45] Date of Patent: Apr. 14, 1992

[54] STEAM INJECTION PROFILE CONTROL AGENT AND PROCESS

[75] Inventor: Paul Shu, Cranbury, N.J.

[73] Assignee: Mobil Oil Corporation, Fairfax, Va.

[21] Appl. No.: 622,588

[22] Filed: Dec. 3, 1990

[51] Int. Cl.$^5$ .................. E21B 33/138; E21B 43/22; E21B 43/24

[52] U.S. Cl. .................. 166/272; 166/293; 166/300

[58] Field of Search .............. 166/272, 275, 274, 292, 166/293, 300, 303, 280, 270

[56] References Cited

U.S. PATENT DOCUMENTS

| | | | |
|---|---|---|---|
| 1,421,706 | 7/1922 | Mills | 166/300 |
| 2,402,588 | 6/1946 | Andresen | 166/21 |
| 3,175,611 | 3/1965 | Hower | 166/293 |
| 3,202,214 | 8/1965 | McLaughlin | 166/292 |
| 3,645,336 | 2/1972 | Young et al. | 166/292 |
| 3,658,131 | 4/1972 | Biles | 166/273 |
| 3,805,893 | 4/1974 | Sarem | 166/270 |
| 3,965,986 | 6/1976 | Christopher | 166/292 |
| 4,676,318 | 6/1987 | Myers et al. | 166/292 |

Primary Examiner—George A. Suchfield
Attorney, Agent, or Firm—Alexander J. McKillop; Charles J. Speciale; Charles A. Malone

[57] ABSTRACT

A method for controlling the profile of a formation where temperatures higher than 400 degress F. are encountered. An aqueous solution of potassium silicate is injected into a zone of greater permeability in a formation. Afterwards, an alcoholic solution of hydrated calcium chloride is injected into the greater permeability zone. Calcium silicate is formed in-situ thereby substantially reducing the permeability of the higher permeability zone. Thereafter, a steam-flooding or fireflooding operation is commenced in a lower permeability zone.

14 Claims, 1 Drawing Sheet

STEAM INJECTION PROFILE CONTROL AGENT AND PROCESS

FIELD OF THE INVENTION

This invention relates to the plugging of a more permeable zone of a subterranean formation. More particularly, the invention relates to a novel method of forming a calcium silicate in-situ which covers a substantial areal extent of a more permeable zone. The method of this invention is especially useful in promoting more uniform fluid injection patterns so as to tolerate high pH steam while conducting a steam-flooding or fire-flooding enhanced oil recovery operation in a lesser permeability zone.

BACKGROUND OF THE INVENTION

Steam or fire stimulation recovery techniques are used to increase production from a oil-bearing formation. In steam stimulation techniques, steam is used to heat a section of a formation adjacent to a wellbore so that production rates are increased through lowered oil viscosities.

In a typical conventional steam stimulation injection cycle, steam is injected into a desired section of a reservoir or formation. A shut-in (or soak phase) may follow, in which thermal energy diffuses through the formation. A production phase follows in which oil is produced until oil production rates decrease to an uneconomical amount. Subsequent injection cycles are often used to increase recovery.

Steam stimulation techniques recover oil at rates as high as 80–85% of the original oil in place in zones at which steam contacts the reservoir. However, there are problems in contacting all zones of a formation due to heterogeneities in the reservoir, such as high/low permeability streaks, which may cause steam fingering. When any of these heterogeneities are present in a reservoir, the efficiency of a process begins to deteriorate due to reduced reservoir pressure, reservoir reheating, longer production cycles and reduced oil-steam ratios. As a result, steam stimulation may become unprofitable.

Various methods have been proposed so that steam can be diverted to uncontacted zones of a formation. One such method is disclosed in U.S. Pat. No. 2,402,588 which issued to Andersen. Andersen disclosed a method of filling a more permeable zone of a reservoir by injecting a dilute alkaline solution of sodium silicate under low pressure. An acid gas such as carbon dioxide is then injected to reduce the alkalinity of the solution, which results in the forming of a silica gel.

Another method is disclosed in U.S. Pat. No. 3,645,446 which issued to Young et al. Young discloses the plugging of a zone of a reservoir by injecting a mixture of steam and sodium silicate into the permeable zone. A second mixture containing steam and a gelling agent such as carbon dioxide is injected into the permeable zone and the two mixtures are allowed to react. A hard silica gel plug is formed.

Another method is disclosed in U.S. Pat. No. 3,805,893 which issued to Sarem. Sarem discloses the formation of a gelatinous precipitate by injecting small slugs of a dilute aqueous alkali metal silicate solution, followed by water and then a dilute aqueous solution of a water-soluble material which reacts with the alkali metal silicate to form a precipitate. The precipitate hardens to form a substantially impermeable substance. A water-flooding oil recovery method is then conducted in a lower permeability zone.

Christopher discloses another method in U.S. Pat. No. 3,965,986. In this method, a slug of liquid colloidal silica and water is injected into a reservoir. This slug has a relatively low viscosity. A surfactant is next injected therein which forms a gel on contact with the silica slug.

In each of the above methods, a relatively impermeable gel can be formed. However, none of the above methods provide for a way of retaining a desired permeability of a formation where high pH's ($>10$) are encountered since they form a plug which is silica in nature.

Therefore, what is needed is a method for controlling the permeability of a formation to the extent desired so as to enable the conducting of a steam-flooding or fire-flooding operation in a zone of lesser permeability.

SUMMARY

This invention is directed to a method for permeability profile control where a steam-flooding or fire-flooding enhanced oil recovery is initiated. In the practice of this invention, an alkali metal silicate solution is injected into a higher permeability zone of the formation. The alkali metal silicate is prevented from entering a zone of lower permeability by utilization of a mechanical packer or by increasing the viscosity of the silicate. As the alkali metal silicate enters the higher permeability zone, it saturates said zone.

After a desired volume of silicate has been placed into the higher permeability zone, an alcoholic solution of hydrated calcium chloride is next injected into the higher permeability zone. Upon coming into contact with the alkali metal silicate solution which has saturated the higher permeability zone, calcium chloride reacts with the alkali metal silicate to form calcium silicate in-situ. As the calcium chloride flows through the higher permeability zone a calcium silicate cement forms which binds silica containing particles in said zone while decreasing the permeability of the zone and retaining a desired permeability therein. The calcium silicate cement which is formed is stable at high pH's and temperatures in excess of about 400° F. These steps can be repeated until the permeability of the zone has been reduced to the extent desired. Thereafter, a steam stimulation or fire-flooding enhanced oil recovery operation is initiated in a zone of lower permeability in said formation to remove hydrocarbonaceous fluids therefrom.

By controlling the strength and rate of injection of the alkali metal silicate and the calcium chloride which are injected into the higher permeability zone, the permeability of the formation can be tailored as desired.

It is therefore an object of this invention to provide for an in-situ calcium silicate composition for reducing the permeability of a zone within a formation which is more natural to a formation's environment.

It is another object of this invention to provide for a composition which will ensure an even flow front and a homogeneous consolidation when reducing the permeability of a zone.

It is a still yet further object of this invention to provide for a formation profile control method which can be reversed by treating the consolidated interval with a strong acid.

It is an even still yet further object of this invention to provide for a formation consolidation agent which is resistant to high temperatures and high pH's.

BRIEF DESCRIPTION OF THE PREFERRED EMBODIMENT

Figure 1:
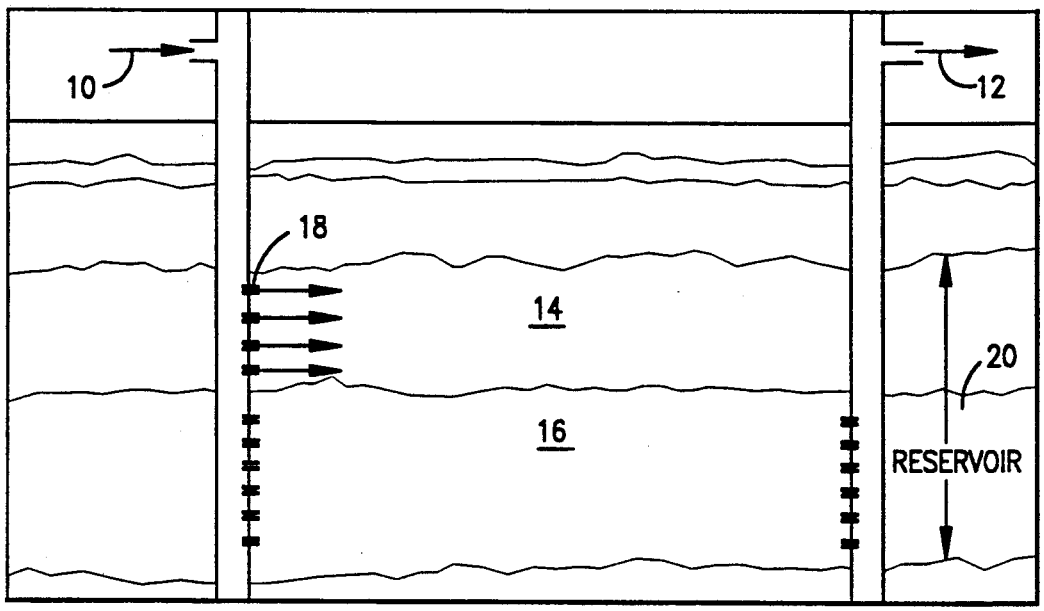
FIG. 1 is a schematic illustration which shows placement of the components of this invention in a higher permeability zone of a formation.

This invention concerns an improvement in the sweep efficiency of a thermal oil recovery process by injecting a steam-flooding medium, in-situ combustion medium, or other high temperature flooding mediums, into a viscous, oil-containing formation that tends to channel through relatively high permeability zones in a formation to form a thermally-swept zone. When a need to reduce the permeability has been determined, an aqueous solution containing an alkali metal silicate is injected into a higher permeability zone. Once the alkali metal silicate has progressed into the higher permeability zone to the extent desired, an alcoholic solution containing a calcium salt is injected into the high permeability zone. This calcium salt reacts with the alkali metal silicate thereby forming a calcium silicate cement in-situ which consolidates the higher permeability zone and reduces its permeability. Injection of the alkali metal silicate and calcium salt can be repeated until the higher permeability zone's permeability is reduced to a desired extent.

Thereafter, a thermal oil recovery or other high-temperature oil recovery method is initiated into a zone of lesser permeability within the formation and hydrocarbonaceous fluids are removed therefrom. While the thermal oil recovery method is being conducted in the lower permeability zone, temperatures within that zone may exceed about 400 F. A method for the selective placement of polymer gels for profile control in a thermal oil recovery method is discussed in U.S. Pat. No. 4,804,043 which issued to Shu et al. on Feb. 14, 1989. This patent is hereby incorporated by reference herein.

Alkali metal silicates having a $SiO_2/M_2O$ molar ratio of about 0.5 to about 2 are suitable for forming an alkali stable silicate cement. The metal (M) which is utilized herein comprises sodium, potassium, lithium, or ammonium ions. Preferably, the $SiO_2/M_2$) molar ratio is in the range of about 0.5 to about 1. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and more effective in permeability reduction due to higher contents of solids.

The viscosity of the silicate solution can also determine the extent to which it will enter a higher permeability zone. In those cases where it is not possible to control the viscosity of the silicate solution and preclude entry into a lower permeability zone, a mechanical packer may be used. The calcium silicate cement which is formed can withstand pH's greater than about 10 and temperatures in excess of about 500° F. The preferred silicates are sodium and potassium. Potassium is preferred over sodium silicate because of its lower viscosity. Fumed silica, colloidal silica, or alkalines can be added to modify the $SiO_2/M_2O$ molar ratio of commercial silicate. Colloidal silicate can be used alone or suspended in the alkali metal silicate as a means of modifying silicate content, pH, and/or $SiO_2$ content.

The calcium salt which can be used herein is one which is soluble in alcohol. Calcium chloride hydrate is preferred. However, chelated calcium forms can also be used. Methanol and ethanol are the alcohols preferred for use herein. This is due to their high availability. Higher alcohols also can be utilized, as well as other solvents capable of dissolving calcium salts and chelates. Solvents such as ketones, tetrahydrofuran (THF), and dimethyl sulfoxide (DMSO) can be utilized. The concentration of calcium chloride hydrate should be in the range of about 10 to about 40 wt. percent, preferably 20 to about 30 wt. percent. Of course, enough calcium chloride solution should be used to complete the reaction with the alkali metal silicate.

Figure 2:
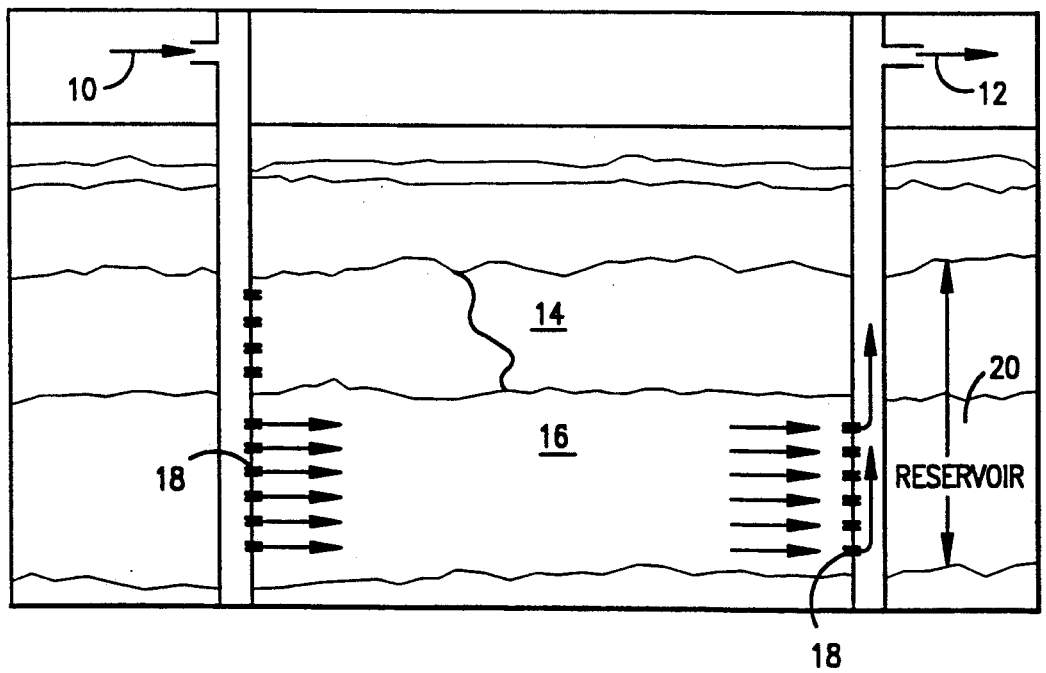
FIG. 2 is a schematic illustration which depicts a higher permeability zone reduced in permeability with the composition of this invention while a thermal oil recovery method is being initiated in a lower permeability zone.

Referring to FIG. 1, an alkaline metal silicate is injected into injector well 10 where it enters high permeability zone 14 of reservoir 20 through perforations 18. Afterwards, an alcoholic solution containing a calcium salt soluble therein is injected into higher permeability zone where it forms calcium silicate cement in-situ which is stable to temperatures in excess of about 500° F. Once the calcium silicate has hardened and the permeability of higher permeability zone 14 has been reduced to the extent desired, by repeated applications if necessary, steam injection is initiated into lower permeability zone 16 as is shown in FIG. 2. Steam exits reservoir 20 by perforations 18 into producer well 12.

In order to show the effectiveness of this method, consolidated sandpacks were prepared by mixing 40/60 mesh sand with appropriate amounts of potassium silicate solutions of various $SiO_2K_2O$ molar ratios to a desired potassium silicate content. One pore volume of $CaCl_2 \cdot 2H_2O$, 30% in ethanol, was then flowed through the potassium silicate loaded sandpack to form sandpacks with reduced permeabilities. A typical non-consolidated 40/60 mesh sandpack has a permeability of 60 darcies. Resistance to alkali of these consolidated sand cores was tested in a 10% NaOH solution at 195°F. for 16 hours to observe the integrity of the cores. If a core remained intact, then its physical strength was tested by an ultrasonic generator at 120 watts output for five minutes under water. Core stability was evaluated by the weight of loose sand produced per unit core surface area exposed to ultrasound. Less sand is produced with a stronger core. The following examples show the effectiveness of the method.

| Example | $SiO_2/K_2O$ | Potassium Silicate Content, % | Sand Production $g/in^2$ | Darcy Permeability |
|---|---|---|---|---|
| 1 | 1.6 | 3 | 3.1 | 0.3–0.9 |
| 2 | 1 | 2.2 | 7.5 | 0.9 |
| 3 | 1 | 3.3 | 1.4 | 0.3–1.5 |
| 4 | 0.5 | 2.5 | 2.4 | NA |
| 5 | 0.5 | 3.75 | 1.1 | NA |

EXAMPLE 6

One pore volume of 45% potassium silicate with a $SiO_2/K_2O$ ratio of 1, followed by another pore volume of 30% $CaCl_2 \cdot 2H_2O$ in ethanol, were flowed through a 40/60 sandpack, one inch in diameter and six inches long, to achieve a reduced permeability.

EXAMPLE 7

The same procedure as in Example 6 was followed here, except a 50% potassium silicate with a $SiO_2/K_2O$ ratio of 0.5 was used. An even lower permeability was produced.

EXAMPLE 8

In this example, a one-inch diameter by 12-inch long 12/20 sand pack was utilized. The purpose of this procedure was to evaluate the ability of the cement to withstand a high pH and high temperature environment. Flow experiments were performed by first injecting an aqueous potassium silicate solution into the 12/20 sand pack. This was followed by injection of a calcium chloride/ethanol solution. Calcium silicate cement deposited in the pack was formed by an instantaneous contact reaction of the flowing calcium chloride solution with the potassium silicate solution at room temperature.

Subsequent results showed significant resistance buildup along the full length of the 12-inch pack. Permeability reduction of 15,000 (residual permeability of 34 md) was achieved after repeating the injection procedure three times. The cemented pack showed excellent thermal and high pH stability. After 300 PV of caustic steamflooding at 500° F and a resultant pH of 11, the residual permeability of the cemented pack was about 60 md. This showed that the cement has great potential for steam profile control applications due to its stability to caustic steam. Potassium silicate used herein was about 40 to about 50 percent by weight.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed is:

1. A method for controlling a formation's profile where temperatures higher than 400 degrees F. are encountered in a substantially silica or sand containing formation comprising:
   a) injecting an aqueous solution of an alkali metal silicate into a zone of higher permeability;
   b) injecting a solvent solution containing a calcium salt in an amount sufficient to react with the alkali metal silicate as the solvent solution flows a front evenly through said zone thereby forming a calcium silicate cement which binds silica containing particles in said zone while decreasing the permeability of the zone and retaining a desired permeability of the higher permeability zone; and
   c) initiating a thermal oil recovery method in a zone of lesser permeability within said formation and removing hydrocarbonaceous fluids therefrom where said recovery method causes the formation to be heated to a temperature in excess of about 400 degrees F.

2. The method as recited in claim 1 where the alkali metal silicate is a member selected from the group consisting of ions of sodium, potassium, lithium, or ammonium and mixtures thereof.

3. The method as recited in claim 1 where the alkali metal silicate has a silicon dioxide to metal oxide molar ratio of about 0.5 to about 2.

4. The method as recited in claim 1 where said calcium salt is a member selected from the group consisting of calcium chloride hydrate, chelated calcium, and other calcium salts soluble in alcohol.

5. The method as recited in claim 1 where the solvent solution is a member selected from the group consisting of methanol, ethanol, higher alcohols, ketones, tetrahydrofuran, and dimethyl sulfoxide.

6. The method as recited in claim 1 where the silicate is contained in the solution in an amount of from about 10 to about 60 weight percent.

7. The method as recited in claim 1 where the calcium salt is contained in said solution in an amount of about 10 to about 40 weight percent.

8. The method as recited in claim 1 where steps a) and b) are repeated until the permeability of the formation has been reduced to the extent desired.

9. The method as recited in claim 1 where said calcium silicate withstands temperatures in excess of about 500 degrees F.

10. The method as recited in claim 1 where the thermal oil recovery method comprises a steam-flood or a fire flood.

11. The method as recited in claim 1 where the calcium silicate withstands a temperature in excess of about 500 degrees F. and a pH in excess of about 10.

12. The method as recited in claim 1 where the formation comprises unconsolidated sand.

13. The method as recited in claim 1 where the silicon dioxide to metal oxide molar ratio is less than about 2.

14. A method for altering a formation's profile which formation contains substantially silica or sand particles comprising:
   a) injecting an aqueous solution of an alkali metal silicate into a zone of higher permeability;
   b) injecting a solvent solution containing a calcium salt in an amount sufficient to react with the alkali metal silicate as the solvent solution flows a front evenly through said zone thereby forming a calcium silicate cement which binds silica containing particles in said zone while decreasing the permeability of the zone and retaining a desired permeability therein.

* * * * *